United States Patent [19]

Mazza et al.

[11] 4,436,957
[45] Mar. 13, 1984

[54] TELEPHONE SECURITY SYSTEM FOR CORDLESS TELEPHONY

[75] Inventors: Frank J. Mazza, Edison; John DeFilippis, South Amboy, both of N.J.

[73] Assignee: International Telephone and Telegraph Corporation, New York, N.Y.

[21] Appl. No.: 333,528

[22] Filed: Dec. 22, 1981

[51] Int. Cl.³ .................... H04M 1/66; H04Q 7/04
[52] U.S. Cl. ...................... 179/2 EA; 179/18 DA; 179/90 D
[58] Field of Search .......... 179/2 E, 2 EA, 2 EB, 179/2 EC, 18 DA, 90 D, 90 B, 90 BD, 81 R; 455/26, 30, 58; 375/2

[56] References Cited

U.S. PATENT DOCUMENTS

| | | | |
|---|---|---|---|
| 3,568,787 | 6/1971 | Vogelman et al. | 179/2 EA |
| 3,873,781 | 3/1975 | Nissim | 179/18 DA X |
| 3,931,476 | 1/1976 | Matthews | 179/18 DA X |
| 4,053,717 | 10/1977 | Snider | 179/2 EA |
| 4,099,033 | 7/1978 | Murray | 179/90 D |
| 4,234,764 | 11/1980 | Beebe | 179/90 D |
| 4,332,981 | 6/1982 | Palombi et al. | 179/2 EA |

Primary Examiner—G. Z. Rubinson
Assistant Examiner—W. J. Brady
Attorney, Agent, or Firm—John T. O'Halloran; Mary C. Werner

[57] ABSTRACT

A telephone security system particularly for use with cordless telephone, operates to prevent the base station of the system from being accessed by an unauthorized user.

Preselected digits are set by means of switches. In order to receive a dial tone, the correct digits as selected by the switches must be dialed. The security system operates to compare the dialed digits with those digits set by the switches. If a favorable comparison is had, the security device then connects the telephone line to the base station and allows dial tone to be transmitted to thereby enable a call to be implemented by the user.

17 Claims, 5 Drawing Figures

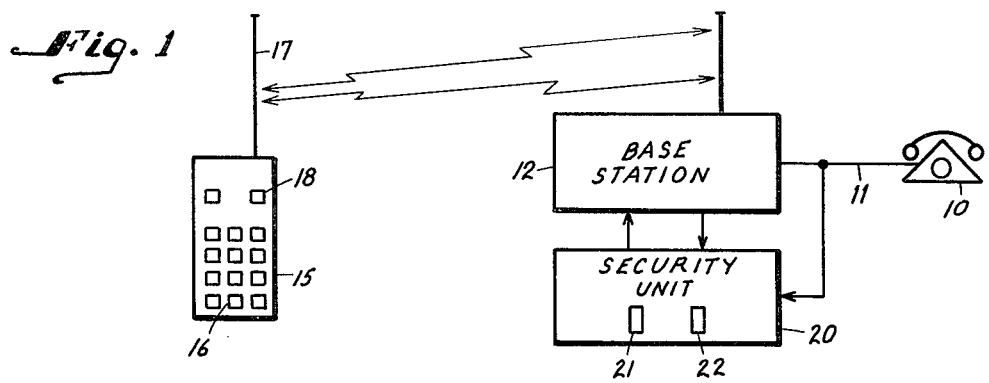
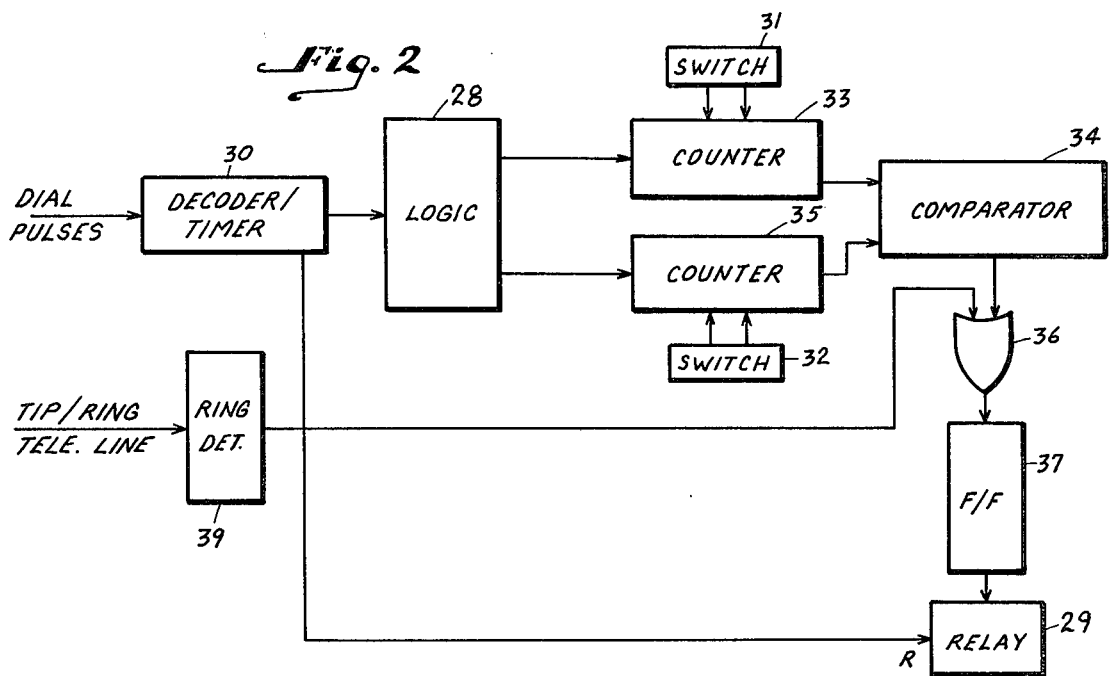
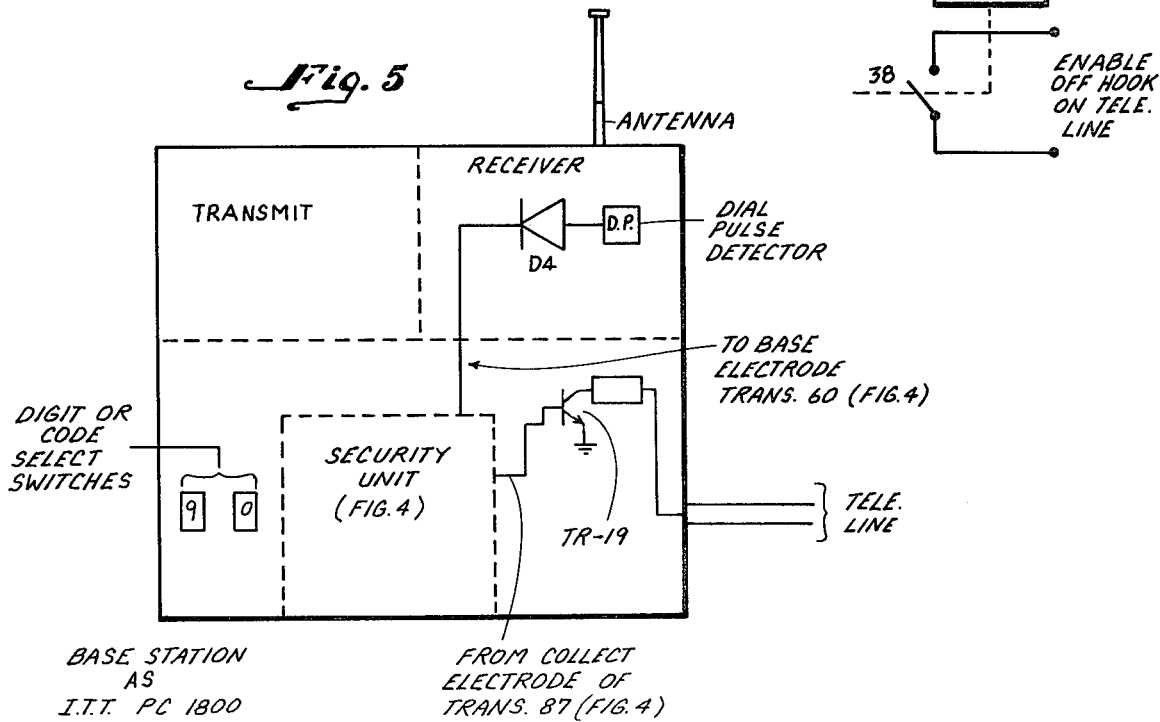

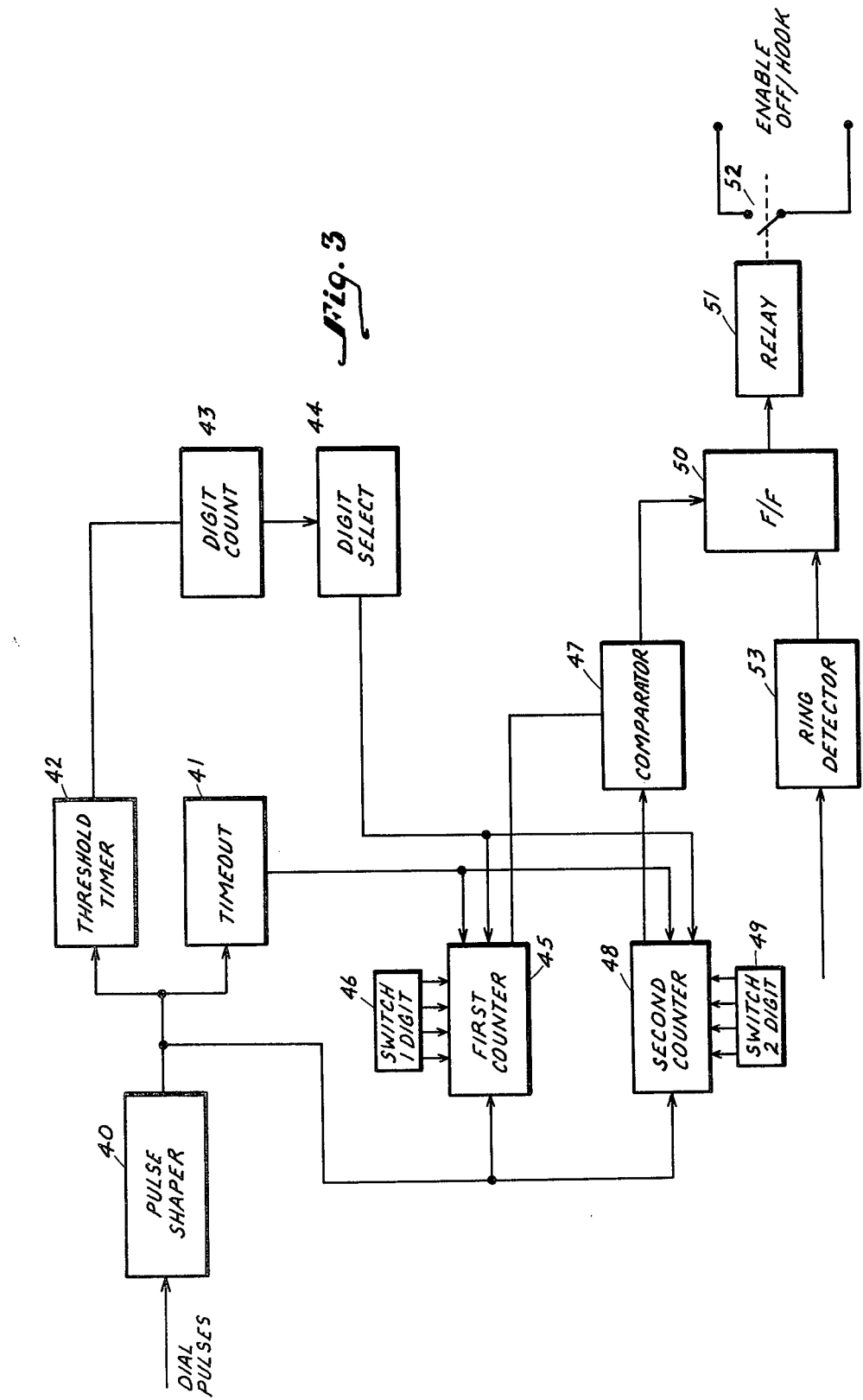

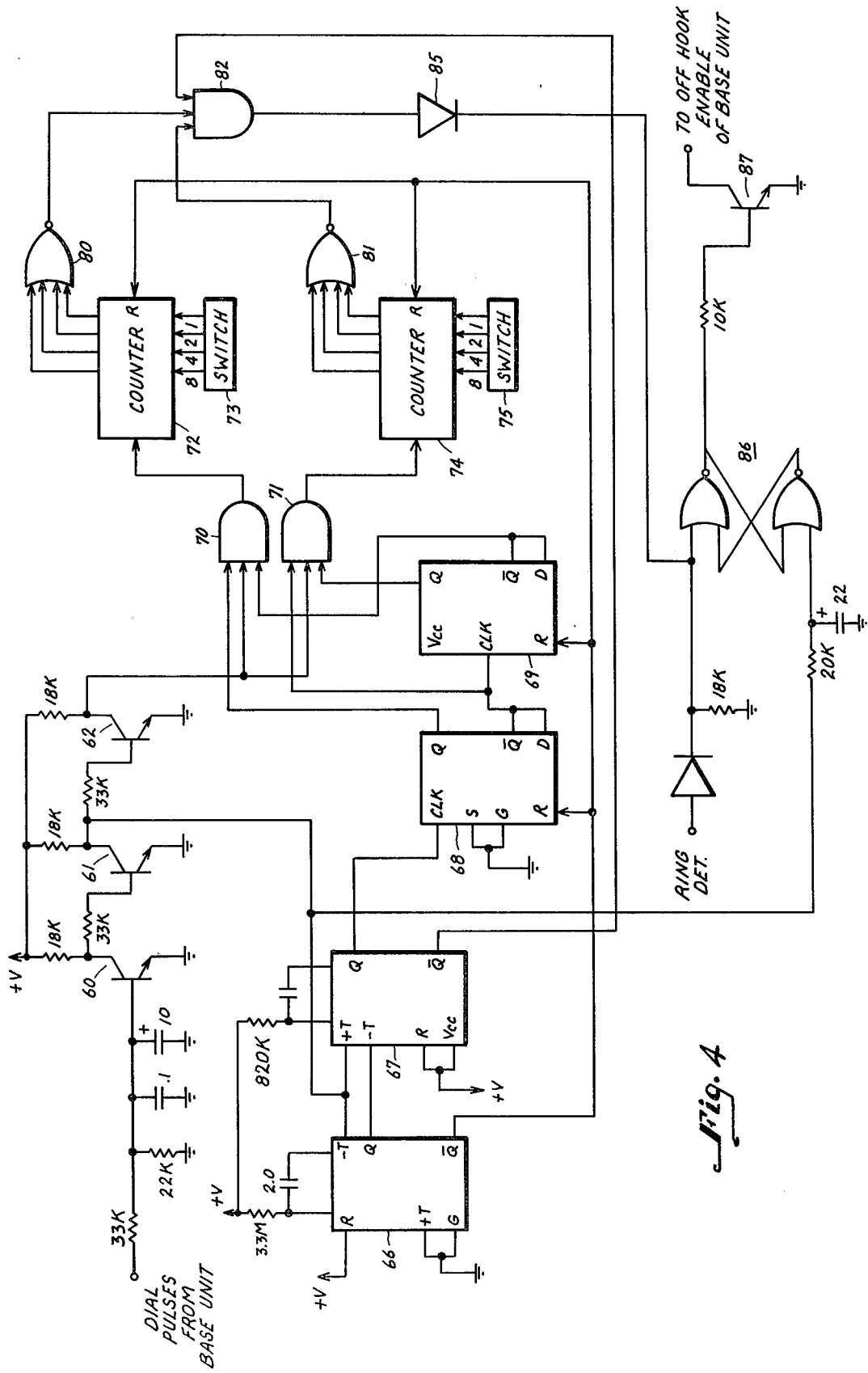

TELEPHONE SECURITY SYSTEM FOR CORDLESS TELEPHONY

BACKGROUND OF INVENTION

This invention relates in general, to a secure telephone system and more particularly to a security system to prevent unauthorized use of a cordless telephone system.

Recently the F.C.C. designated five frequencies to be used for the transmission of signals in a cordless telephone system. These frequencies are in the previously unallocated band at 49 MHz. The frequencies employed in this band are 49.83, 49.845, 49.860, 49.875 and 49.890 MHz. The purpose of the allocation is to implement cordless telephone operation. Essentially such systems are in widespread use and an example of such a system is manufactured and sold by I.T.T., the Consumer Speciality Products Division (CPSD) of Clark, N.J., under the Model No. PC1800. Cordless telephone systems are also made and supplied by a host of other companies.

The systems basically operate as follows:

A cordless telephone system uses a base station which is capable of full duplex operation with a portable hand held remote unit. The base unit is coupled to a user's telephone. When the telephone rings the base station detects ringing and transmits a ring signal to the remote unit using one of the above frequencies. The user having the remote unit receives the signal and returns an "answer" signal to the base unit, which now causes the telephone subset to go "off-hook." The user can now conduct a full conversation from the remote unit to the base unit and therefore through the telephone based on the transmission of signals between the base unit and the remote unit. Such systems also allow the user to initiate a call from the remote unit. To do this a service request is sent to the base unit which in turn transmits dial tone if the telephone is not busy. The remote unit contains a rotary or quick step dialer which enables the user to send dial pulses to the base unit which places the dial pulses on the telephone line to make a call in the same manner as is conventionally done. Hence the base section monitors the telephone line, detects dial tone and transmits the dial tone to the remote unit when a remote call is to be placed. These functions are carried out between the base unit and the remote unit at the allocated frequencies.

The typical distance for reliable transmission between a base station and a remote unit is about 1000 feet more or less depending on transmission conditions and other factors. Thus the cordless telephone system allows a user to be away from his phone, or by the pool or in the backyard with complete access to the phone according to operation. This provides great convenience for the user and the cordless telephone system is a highly successful product.

However, the advent of the cordless telephone system has created a substantial problem. Because the allocated frequencies only total five frequencies, may users are, in fact, assigned the same frequencies for transmitting and receiving. People who are cognizant of this fact have used the remote unit to place unauthorized telephone calls from the telephone lines of other users. For example, a person having a remote unit can access any base station operating on a compatible frequency. The person can therefore receive the dial tone and place a call on another person's telephone. If the person is intent in doing so he may further use an automobile and travel about with the remote unit to access other telephones operating on the same frequency. This problem is presently a serious one, but it will become even greater as more cordless systems are employed, as the likelihood of accessing the correct frequency greatly increases with the supply of additional units.

It is therefore an object of the present invention to provide apparatus operating in conjunction with the base station to mitigate against improper access as above described.

The apparatus provided is relatively inexpensive and reliable and is adapted to operate with most existing cordless systems as well as capable of being provided as an add-on to such systems.

DESCRIPTION OF THE PREFERRED EMBODIMENT

A security system operates in combination with a cordless telephone system. The cordless telephone system is of the type having a base unit which is coupled to a telephone line. The base unit transmits signals and receives signals from a remote unit. The remote unit is used by a subscriber to contact the base station to enable him to place a call. In order to prevent unauthorized use and therefore to prevent an unauthorized user from obtaining dial tone, the security system as associated with the system includes at least one switch which can be preset by the user to a predetermined number. In order to access the base unit, a signal representing this number is sent from the remote unit to the base unit. The security system detects the dialed number and compares the dialed number with the preset number. If a favorable comparison is made then the base unit is commanded by the security system to place the telephone line in an "off-hook" condition. In this condition dial tone will be transmitted to the remote unit. If a favorable comparison is not made, dial tone will not be transmitted and the security system will cause a timeout until the correct digit or code number is transmitted. The system further includes means for detecting ringing to enable the base station to cause the telephone to go "off-hook" as in conventional operation.

BRIEF DESCRIPTION OF THE DRAWINGS

FIG. 1 is a simple diagram of a cordless telephone employing a security unit according to this invention.

FIG. 2 is a block diagram of a security unit shown in FIG. 1.

FIG. 3 is a block diagram of an alternate embodiment of a security unit.

FIG. 4 is a detailed block diagram of a security unit which can be used with a conventional cordless telephone system.

FIG. 5 is a block diagram showing a security unit fully incorporated and integrated into a base station as employed in a cordless telephone system.

DETAILED DESCRIPTION OF THE INVENTION

Referring to FIG. 1, there is shown a cordless telephone system. Essentially, a telephone subset 10 is connected to a telephone line 11, as is conventional. Also connected to the telephone and telephone line is a base station or base unit 12. The base station has an antenna 14 for transmitting and receiving signals at 49 MHz to a remote unit 15. The remote unit 15 as seen in FIG. 1 also has an antenna 17 which may be a telescoping whip antenna. The remote unit has a dialer 16 which may be a rotary dialer or a quick step dialer or a typical Touch Tone dialer. In any event, the dialer operates to transmit a given number for each button depressed. Therefore, in a quick step dialer, if one depresses the button designated as 1, one pulse is transmitted. The button 2 transmits two pulses and the button 0, transmits 10 pulses. It is of course understood that a rotary dialer also transmits a fixed number of pulses for each digit. The remote unit 15 also has a talk switch 18 which is normally incorporated with an ON/OFF switch.

Essentially, prior art cordless telephone systems as above described consists of a base station 12 and a remote unit 15. When the remote unit wishes to make a call, the user operates switch 18 in the talk position. In this position a carrier frequency is transmitted to the base station 12. The base station detects the carrier and connects the telephone line to the base station if the subset 10 is "on-hook." When the connection is made dial tone is transmitted from the telephone line to the base station and therefore from the base station to the remote unit. The remote unit now proceeds to dial a called number. The base station receives the dial pulses as modulated on the carrier frequency and pulses the telephone line at the proper rate and at the proper sequence, allowing the telephone company to complete the call as is completely conventional and well understood.

As one can see from FIG. 1, if an unauthorized user has a remote unit as 15 operating at the frequency, he can then gain access to the telephone line associated with subset 10 and therefore place an unauthorized call. To prevent this from occurring there is shown a security unit 20. The security unit 20 has two switches 21 and 22 located on a front panel. The switches 21 and 22 allow the user to select any number from 00 to 99. The number selected becomes a code and this code as selected by the user must be first dialed by a remote unit 15 in order to gain access to the dial tone. The user or owner of the base station 12 can change the code as often as desired and can do so on a daily basis. Essentially, the system operates as follows:

The security unit 20 is connected to the telephone line and to the base station. When a remote unit wishes to place a call the switch 18 is placed in a talk position. The base station again receives a request for service but will not complete connection to the telephone line. The base station is controlled by the security unit 20 which expects to receive the proper code before dial tone will be transmitted to the remote unit. The remote unit then dials two digits to correspond to the number selected by switches 21 and 22. The security unit 20 detects the digits and compares those digits with the digits selected by switches 21 and 22. If a favorable comparison is made, the security unit connects the base station to a telephone line in a normal manner. Accordingly, the base station now transmits dial tone as above described and operation commences in the conventional way.

Referring to FIG. 2, there is shown a simplified block diagram of operation of one embodiment of the security unit 20. Essentially, the security unit includes a decoder timer circuit 30. The decoder timer circuit 30 receives dial signals as transmitted to the base station which causes a first timer included in module 30 to be activated. This timers operates to provide a timeout interval. Essentially, the purpose of the timer is to detect the transition from "on-hook" to "off-hook" by the remote station. Upon detection of this transition, the timer begins a timing interval as the security unit now expects to receive a signal indicative of the first two digits, which digits are to be compared with the number set in switches 31 and 32. The switches 31 and 32 are analogous to switches 21 and 22 of FIG. 1.

The decoder 30 also interfaces with a logic circuit 28. Essentially, the decoder 30 also includes a threshold device or timer which operates in parallel with the timeout circuit. This device which may be a one shot to produce pulses indicative of the digits dialed. These digits are used by the logic circuit to direct the first digit to a counter 33. The counter 33 is a down counter and counts down from the number programmed into the counter by switch 31. Thus if the first digit has the proper number, counter 33 will read zero or a predetermined number at the end of the first digit interval. This is an input to a first input of a comparator 34. In a similar manner, the second digit is transferred to another down counter 35 which counter 35 is associated with switch 32. If the second digit contains the correct number of dialed pulses counter 35 will also count down to zero or a predetermined number which is a second input to the comparator 34. The comparator 34 produces an output signal which is sent to OR gate 36. The OR gate 36 operates to trigger a flip-flop 37 which in turn activates a relay 29 associated with contact 39. The contact 38 upon closure causes the telephone line to go "off-hook" and thus causes the base station to transmit dial tone back to the remote unit.

Also shown coupled to OR gate 36 is a ring detector 39. The ring detector 39 has one input coupled to the tip ring terminal of the telephone line. The ring detector 39 is included in the security unit. Essentially, ring detectors are well-known and detector 39 may constitute a fullwave bridge circuit. The detector 39 functions to detect ringing on the telephone line 11. When ringing is detected, this means that a telephone call is being received by the subset 10. In this mode the telephone line will also go "off-hook" so that the subscriber having the remote unit 15 can answer the call. Thus the output of the ring detector 39 also triggers the flip-flop 37 to activate the relay 29 and again allows the telephone line to go "off-hook if the remote unit 15 answers. " In this manner the subscriber will be notified that he is receiving a call as the base station will transmit this information to the subscriber and the subscriber then can communicate with the calling party through the remote unit as is conventional. Thus as can be seen the security unit 20 will not allow the transmission of dial tone until it receives the proper code as set by the subscriber via the switches as 21 and 22 of FIG. 1 or 31 and 32 of FIG. 2.

Referring to FIG. 3, there is shown a more detailed block diagram of the circuit of FIG. 2. Dial pulses which can be separately detected by the security unit in conventional and well-known techniques are transmitted to a pulse shaper circuit 40. The pulse shaper circuit 40 consists of a conventional amplifier which operates to square off the pulses to remove noise and provide reasonable rise and fall times. The output of the pulse shaper is therefore actual dial pulses as received.

As indicated, a timeout circuit 41, which may be a monostable multivibrator, commences a timeout cycle which for example, may be between 5 to 10 seconds. At the same time, a threshold timer 42, which again may be a monostable multivibrator, is activated. The timer 42 is a retriggerable monostable multivibrator and operates to produce a single pulse which is equal to the total width or greater than the dial pulses transmitted. The purpose of the threshold timer is to produce a pulse of a given width indicative of each digit transmitted. For example, if the first digit is a 2, the output of timer 42 will be of a sufficient width to encompass two dial pulses but will be a single pulse. If the next digit is a 5, then the timer 42 will produce a single pulse of a greater width than the first pulse which is indicative of the second digit. The output of the threshold timer 42 is applied to a digit counter 43. The counter 43 responds to the first pulse to cause a digit select circuit 44 to activate the first down counter 45. The digit select circuit 44 may be an ordinary decode gate. The first counter 45 is associated with the first digit switch 46 which for example, functions as switch 21 or 31. The digit selected is programmed by the user in switch 1 and the counter 45 compares the dial pulses received from pulse shaper 40 with the preset count during the first digit time. At the end of this time the output from the counter should be zero or a predetermined number which is transferred to the comparator 47. The digit selector then activates a second counter 48 associated with the second digit switch 49. The second counter also counts pulses from pulse shaper 40 with the number preset by switch 49 and the output of the second counter is then transferred to comparator 47. The comparator 47 operates to compare the count of counters 45 and 48 and if the counters are as anticipated the comparator 47 triggers flip-flop 50 which activates relay 51 closing contact 52 to enable the telephone line to go "off-hook." A ring detector 53 is also included and sets the flip-flop 50 if a ring signal is detected. It is also indicated that if a transition is received and no dialing is implemented then the timeout circuit 41 will reset the first and second counters, as well as the flip-flop 50 and therefore prevent any "off-hook" operation until the proper code is received.

It is also noted that the timeout circuit 41 detects a transition on the telephone line. In this manner if a remote unit is engaged in a call and hangs up or goes back "on-hook" the timeout circuit 41 will be triggered which will allow the subscriber to make another call immediately after this occurs as he will have the full time interval to start dialing.

As can be seen from the above explanation, the security unit can be a completely separate unit and furnished as a black box to be used with any cordless telephone system. However, it is understood that the base station as 12 of FIG. 1 does in fact perform certain functions which are typical of all base stations. Thus a typical base station detects dial pulses as is normal and further detects ringing as is normal. Thus the security unit as 20 can be simply integrated into an existing base unit.

Referring to FIG. 4, there is shown a detailed schematic diagram of a security unit circuit which has been incorporated in the I.T.T. cordless telephone designated as the PC1800. Dial pulses as detected from the base unit are applied to the base electrode of a first NPN transistor 60 arranged in an amplifier configuration. The collector of 60 is coupled to the base of transistor 61 also arranged in an amplifier configuration. All component values for the various resistors and capacitors are shown in FIG. 4 adjacent or next to the component. The value of resistors is designated in ohms and the value of capacitors in microfarads. The output of amplifier 61 is applied to the further amplifying stage 62. Basically, transistors 60, 61 and 62 function as the pulse shaper 40 of FIG. 2. The input to transistor 60 comprises a RC filter network to discriminate against noise and so on. The one shot 66 which functions as the timeout circuit 41 is implemented by a conventional integrated circuit and produces a timeout signal. The threshold timer 42 is implemented by the integrated circuit 67. The modules 66 and 67 are IC components which are commercially available as will be explained. The time intervals necessary are developed by the capacitors shown as 2 microfarads and 0.47 microfarads. The output from the threshold timer circuit 67 is directed to a two stage counter consisting of D-type flip-flops 68 and 69. These function as the digit count 43 of FIG. 3.

Also shown are two AND gates 70 and 71. The gates 70 and 71 function as the digit selector 44 of FIG. 2. Each gate has one input connected to the collector of transistor 62 for receiving dial pulses. One input of gate 70 is connected to flip-flop or counter stage 68 for the first digit with another input connected to the $\overline{Q}$ output of the flip-flop 69. Thus gate 70 will transmit dial pulses indicative of the first digit sent. Gate 71 will transmit dial pulses indicative of the second digit sent. The output of gate 70 is applied to an up down counter 72 associated with switch 73. The switch 73 is a BCD switch and converts a decimal setting to a binary number to be used with the counter 72. In a similar manner, the output of gate 71 is coupled to down counter 74 associated with switch 75 to select the second digit. Each counter is associated with a gate as gate 80 for counter 72 and gate 81 for counter 74. These gates detect the final state of the counters and are coupled to an AND gate 82 which functions as the comparator 47. Thus when dial pulses are received correctly, gates 80 and 81 will cause gate 82 to produce a high at the output. This forward biases diode 85 which then sets the SET/RESET flip-flop 86 which thereby activates transistor 87. The collector of transistor 87 is directed to a suitable transistor circuit in the base unit which causes the telephone line to go "off-hook." Thus as can be seen, the security circuit can be accomodated as a black box to be used with any cordless telephone or can be built-in to an existing unit as described.

In regard to FIG. 4, the components, apart from those listed in the schematic are as follows:

Transistors 60, 61 and 62 can be any conventional NPN transistor such as the 2SC945 supplied by many manufacturers. The units 66 and 67 are integrated circuit chips designated as CD4538 which are CMOS circuits provided by RCA, Motorola, as well as others. The counter stages or "D" flip-flops 68 and 69 are CD4013 units. The AND gates as 70 and 71 are CD4073 units. The gates as 80 and 81 are CD4002 units. The counter stages 72 and 74 are CD4029 which are supplied by RCA. The switches S1 and S2 are BCD rotary switches available from various manufactures.

It is thus seen that the above described security system operates to substantially reduce the possibility of an unauthorized person from seizing a cordless telephone base station and implementing a call. It is of course understood that while the above described techniques are particularly applicable to cordless telephone systems the concept can be used with any existing telephone system. For example, a conventional telephone can be implemented with such a security device to prevent anyone from using the telephone and receiving dial tone unless the predetermined digits are sent. As indicated, the unit also allows one to change the switch settings at will and therefore affords even greater security and protection.

It is of course understood that the concept described above can be further embellished by the use of an additional switch to therefore permit the user to program any number from 000 to 999. The techniques employed in implementing such a system should be apparent to those skilled in the art as the same technique as indicated are employed. Thus one can use three switches or four switches or more to preselect such digits before access will be given. Thus there are many contemplated modifications and alterations which are deemed to be encompassed within the spirit and scope of this invention.

In regard to the above, it is of course clearly understood that the secuirty unit can be simply built into and therefore form part of a base station as shown in FIG. 5. As one can see from FIG. 4, there are two inputs coupled to the security network. One input is the dial pulse input which is obtained from the dial pulse detector which is incorporated in every base unit and operates to receive dial pulses from the remote unit and to amplify these pulses so that they can eventually be placed on the telephone line. For example, in the PC1800 dial pulses are available from the cathode of a diode detector which is designated as D4 in the base station transmitter/receiver of the PC1800. The dial pulses are obtained from the cathode of the diode. The output of transistor 87 of FIG. 4 is directed to the collector of transistor TR19 located in the base unit. The transistor TR19 operates to close a relay which will cause a telephone line to indicate an "offf-hook" condition. This can be accomplished by a relay or other device.

Essentially, the base station of any radio telephone system must detect dial pulses and must detect ringing. The base station must also have means to cause the telephone line to go "off-hook." Therefore, the security unit as described above can be built into any existing base station using the above described principles and techniques. The digit select switches in this instance are mounted directly on a suitable panel associated with the base station. Thus the security unit as above described can be implemented as an external unit or can be directly built-in and incorporated into an existing base unit. To do so would be completely obvious to any one skilled in the art after reading the above noted specification and therefore the appropriate connections or locations for connecting input and output lines should be apparent to those skilled in the art.

We claim:

1. In a cordless telephone system of the type having a base unit coupled to a telephone line and for transmitting to and receiving signals from a remote unit associated with said base unit, said remote unit also capable of transmitting to and receiving signals from said base unit, said base unit capable of causing said telephone line to go "off-hook" when requested by said remote unit to cause dial tone to be transmitted to said remote unit, the combination therewith of apparatus for preventing the transmission of dial tone from said base unit to said remote unit until authorized, said apparatus comprising:

means for storing a predetermined signal code in said base unit;

means located in said base unit for receiving signals transmitted by said remote unit when it is desired to transmit a dial tone to said remote unit from said base unit, said signals including signals indicative of said predetermined code, and said means for receiving said signals including a first timing circuit operative to provide a timing interval of a given duration when a transition pulse is detected indicative of a dial signal, whereby if additional pulses are not received during said interval said telephone is inhibited from receiving said dial tone;

means associated with said base unit for comparing said signals received from said remote unit with said stored signals indicative of said predetermined signal code in order to detect a favorable comparison therebetween; and means for activating said telephone line to transmit said dial tone from said base unit to said remote unit when a favorable comparison is made.

2. The cordless telephone system according to claim 1 wherein said means associated with said base unit for storing said predetermined code comprises at least one switch capable of selecting a number between 0-9 indicative of said code.

3. The cordless telephone system according to claim 1 wherein said code as selected comprises first and second numerical digits capable of providing any code between 00 to 99.

4. The cordless telephone system according to claim 3 wherein said signals indicative of said predetermined code as transmitted by said base unit include a first and a second dialed digit; and wherein said means for receiving said signals includes first means for detecting said first digaled digit, and second means for detecting said second dialed digit.

5. The cordless telephone system according to claim 4 wherein said means for comparing includes, a first counter having a preset input indicative of said first numerical digit, a second counter having a preset input indicative of said second numerical digit, a selection means coupled to said first and second means and operative to direct dial pulses indicative of said first dialed digit to said first counter and to direct dial pulses indicative of said second dialed digit to said second counter.

6. The cordless telephone system according to claim 5 wherein said first and second counters are down counters with said numerical digits preset therein to cause said counters to count down from said preset count according to the number of dial pulses received.

7. The cordless telephone system according to claim 6 wherein said means for comparing includes a gate for comparing the outputs of said first and second counters to indicate said favorable comparison when said outputs are at predetermined values.

8. The cordless telephone system according to claim 1 wherein said means associated with said base unit for selecting said code includes first and second switches, each capable of selecting a digit from 0-9.

9. A security system to prevent unauthorized access to a telephone line by preventing the transmission of unauthorized dial tone, comprising:

means for selecting a predetermined signal code indicative of a desired code manifesting an authorized call, means for transmitting code signals including dialed digits indicative of said selected signal code, dial signal detecting means coupled to said line and responsive to said code signals during a time interval of limited duration commencing upon detection of a first of said code digits to detect said dialed digits to provide a detected signal indicative of said digits, and logic means for comparing said detected signal with said selected code to cause said telephone line to transmit said dial tone upon a favorable comparison and to prevent dial tone transmission upon an unfavorable comparison.

10. The security system according to claim 9 further comprising:

ringing detector means coupled to said line and operative to detect a ringing signal, to cause said logic means to cause said telephone line to transmit upon detection of said ringing.

11. The security system according to claim 9 wherein said means for selecting said predetermined code comprises at least one switch for selecting a number between 0-9.

12. The security system according to claim 9 wherein said means for selecting said predetermined code comprises two switches for selecting any number between 00-99.

13. The security system according to claim 9 wherein said telephone line is associated with a base unit for monitoring said line and transmitting the status of said line to a remote unit at a given frequency, with said remote unit capable of accessing said base unit to request a dial tone, with said remote unit capable of transmitting said dial signals to be received by said base station and detected by said dial signal detecting means.

14. A security system apparatus for a cordless telephone system having a base station and a remote station, with the base station capable of controlling said telephone line and communicating with said remote station, comprising:

means located at said base station to select a predetermined code indicative of a signal for authorizing said base station to transmit dial tone, means located at said remote station for transmitting code signals including dialed digits indicative of said signal code, dial signal detecting means responsive to said code signals during a time interval of limited duration commencing upon detection of a first of said code digits to detect the dial signals received by said base station to provide a detected signal indicative of said received dial signals, means for comparing said detected signal with said predetermined code to provide a control signal upon a favorable comparison, and means responsive to said control signal for causing said base station to issue a dial tone only upon receipt of said favorable comparison.

15. The cordless telephone system according to claim 1 further comprising:

means located in said remote unit for transmitting signals indicative of said predetermined signal code when it is desired to receive said dial tone from said base unit.

16. The security system according to claim 9 further comprising a base unit containing said dial signal detecting means and logic means and a remote unit; and wherein the means for selecting a predetermined signal code is located in said remote unit.

17. The security system apparatus according to claim 14 further comprising:

means located in said remote station for transmitting said signals indicative of said predetermined signal code when it is desired to receive said dial tone from said base station.

* * * * *